United States Patent [19]
Couts et al.

[11] Patent Number: 5,742,730
[45] Date of Patent: Apr. 21, 1998

[54] TAPE CONTROL SYSTEM

[76] Inventors: David A. Couts, 10116 Walker Lake Dr., Great Falls, Va. 22066; Richard B. McMurray, 3203 Plantation Pkwy., Fairfax, Va. 22030; Xiang Mao, 2805 Strauss Ter., Silver Spring, Md. 20904

[21] Appl. No.: 401,225
[22] Filed: Mar. 9, 1995
[51] Int. Cl.⁶ ................................................ H04N 5/783
[52] U.S. Cl. ................................................ 386/69; 386/81
[58] Field of Search .............................. 386/4, 6, 1, 52, 386/60, 62, 64, 65, 69, 70, 81; 360/72.1, 72.2, 71; H04N 5/76, 5/783, 5/92, 9/79

[56] References Cited

U.S. PATENT DOCUMENTS

| | | | |
|---|---|---|---|
| 3,714,382 | 1/1973 | Sykes. | |
| 4,422,105 | 12/1983 | Rodech | 360/72.1 |
| 4,473,853 | 9/1984 | Corkery | 360/72.2 |
| 4,499,569 | 2/1985 | Lopez De Romana | 358/342 |
| 4,511,937 | 4/1985 | Guerrero | 360/72.1 |
| 4,663,679 | 5/1987 | Sekiguchi et al. | 360/14.3 |
| 4,692,819 | 9/1987 | Steele | 360/72.1 |
| 4,805,053 | 2/1989 | Yamanaka et al. | 360/72.3 |
| 4,819,087 | 4/1989 | Takeuchi et al. | 360/14.3 |
| 4,873,584 | 10/1989 | Hashimoto | 358/535 |
| 4,945,425 | 7/1990 | Hahn | 360/14.3 |
| 4,953,040 | 8/1990 | Hedtke et al. | 360/14.3 |
| 5,043,829 | 8/1991 | Hahn | 360/14.3 |
| 5,206,767 | 4/1993 | Heep | 360/72.1 |
| 5,523,852 | 6/1996 | Sowerby et al. | 360/14.3 |
| 5,541,781 | 7/1996 | Barr et al. | 386/65 |

*Primary Examiner*—Thai Tran
*Attorney, Agent, or Firm*—John J. Byrne

[57] ABSTRACT

The system controls one or more VCRs to perform various operations including rapid and accurate tape repositioning from any point to any other point utilizing time codes and VCR performance data. They system includes the ability to encode, record, and reproduce a video signal with time codes and other information such as text commentary, directories to the tape content and VCR commands. Tapes prepared on any implementation of the system can be positioned on any other implementation except that the copying process must translate as appropriate between different signal formats (NTSC, PAL, SECAM), tape formats (VHS, Video 8, etc.) and encoding systems. The system includes a method for characterizing the tape transport performance of individual VCRs in the various tape transport modes including fast forward and rewind and during transitions between transport modes. It includes a method for utilizing the resulting data to determine an optimum sequence of VCR commands for repositioning from any tape location to any other. The system can be used to simultaneously timecode and annotate or transcribe an audio-video signal as it is being recorded. The resulting text record can then be used as an index to position the videotape. A closed captioned television transmission can be timecoded as it is being received and recorded, and the captions simultaneously read, indexed and stored for use in positioning the videotape. The system can be used to play a sequence of video segments from separate tapes through simultaneous control of multiple VCRs.

8 Claims, 10 Drawing Sheets

| | | |
|---|---|---|
| 18 | | {The number 18 indicates the number of segments in the table of contents} |
| 1540 | 1698 | NATIONAL AERONAUTICS AND SPACE ADMINISTR |
| 2250 | 2267 | The Space Shuttle: Reaching for the Futu |
| 3216 | 3239 | Beginning of the Journey: Kennedy Space |
| 3810 | 4607 | The Orbiter Processing Facility |
| 4680 | 6200 | Marshall Space Center |
| 6280 | 6900 | John C. Stennis Space Center |
| 6980 | 7701 | Johnson Space Center: (Mission Control) |
| 7781 | 8220 | Personnel Selection & Training |
| 8300 | 9815 | Goddard Space Center |
| 9895 | 10119 | Wallops Flight Facility |
| 10200 | 11140 | Langley Research Center |
| 11220 | 12200 | Jet Propulsion Laboratory |
| 12280 | 13096 | Lewis Research Center |
| 13170 | 13764 | Ames Research Center |
| 13840 | 14172 | Q.L.Dryden Flight Research Facility |
| 14250 | 15081 | NASA Headquarters |
| 15160 | 15498 | Credits |
| 15580 | 16545 | THE END |
| 1 | | {Numeral 1 indicates that one script is defined.} |
| 3,3,4,2 A Space Flight | | {The first number is the number of segments in the first script. The number that follow, 3,4,2, indicate that the first script consists of the third, fourth and second segments in the table of contents. Then follows the script's title.} |

FIG. 8

An example of a Table of Contents and formatting characters. This is the information that is actually stored on tape. Four bytes of data are stored in each video frame - 120 bytes/sec.

| | | | | | |
|---|---|---|---|---|---|
| 001 | 05 | ! | BEGIN | | |
| 002 | 03 | M | 038 | | |
| 003 | 09 | [ | space.toc | | |
| 004 | 11 | - | Version 1.0 | | |
| 005 | 19 | 8 | 02-17-1995 16:19:20 | | |
| 006 | 16 | 9 | QTT Version 1.20 | | |
| 007 | 27 | P | Space Shuttle American Team | | |
| 008 | 10 | ) | 01-16-1995 | | |
| 009 | 03 | p | 1 | | |
| 010 | 04 | c | 23 | | |
| 011 | 68 | ` | 706 | 796 | National Aeronautics and Space Administr |
| 012 | 63 | s | 796 | 1376 | Flight:Man's Most Challenging Quest |
| 013 | 65 | \ | 815 | 946 | To Be Free And Fly Like The Birds ... |
| 014 | 48 | \ | 946 | 1009 | To Touch The Sky ... |
| 015 | 56 | z | 1009 | 1034 | And Soar With The Eagles ... |
| 016 | 52 | L | 1034 | 1059 | Man Conquers The Sky ... |
| 017 | 55 | W | 1063 | 1409 | And Goes Beyond The Clouds. |
| 018 | 68 | B | 1376 | 1416 | The Space Shuttle: Reaching for the Futu |
| 019 | 68 | B | 2351 | 2958 | Kennedy Space Center:Beginning The Journ |
| 020 | 59 | 6 | 2958 | 3813 | The Orbiter Processing Facility |
| 021 | 49 | M | 3813 | 5480 | Marshall Space Center |
| 022 | 56 | a | 5480 | 6111 | John C. Stennis Space Center |
| 023 | 67 | k | 6111 | 6931 | Johnson Space Center: (Mission Control) |
| 024 | 58 | G | 6931 | 7411 | Personnel Selection & Training |
| 025 | 48 | F | 7406 | 9046 | Goddard Space Center |
| 026 | 51 | N | 9046 | 9348 | Wallops Flight Facility |
| 027 | 51 | ] | 9348 | 10373 | Langley Research Center |
| 028 | 53 | - | 10373 | 11428 | Jet Propulsion Laboratory |
| 029 | 49 | s | 11428 | 12328 | Lewis Research Center |
| 030 | 48 | o | 12328 | 12988 | Ames Research Center |
| 031 | 63 | u | 12988 | 13398 | Q.L.Dryden Flight Research Facility |
| 032 | 45 | { | 13398 | 14266 | NASA Headquarters |
| 033 | 35 | b | 14266 | 14781 | Credits |
| 034 | 03 | r | 1 | | |
| 035 | 49 | " | NASA Script | | 4,4,7,5,3 |
| 036 | 04 | Y | 16 | | |
| 037 | 04 | V | 18 | | |
| 038 | 03 | g | END | | |

↳ Data Line. Each data line is followed by ASCII(13).
End line is followed by ASCII(3).

↳ This column contains a byte representing a checksum for the rest of the line.

↳ This column contains the number of characters that follow the checksum in the current line.

↳ This column contains the line number of the current line.

FIG. 9

TAPE CONTROL SYSTEM

BACKGROUND OF THE INVENTION

1. Technical Field

A limitation of VCRs and other tape recorders is the linear character of their recording and reproduction process. To access information recorded at an arbitrary location on a tape, the tape must be wound from a supply reel to a take-up reel until the desired information is located at the playback heads.

Positioning to a desired location by winding tape at playback speed could take several hours and would be limited to forward locations. To speed the process and enable positioning to arbitrary locations, VCRs and most other tape players can wind tape at higher speeds in forward and reverse directions under manual control. In VCRs, a built-in tape counter is provided to assist the manual positioning process. The user sets the counter to zero at the beginning of the tape, and views the tape noting the counter reading at the beginning and end of each segment of interest. When subsequently positioning to such a segment, the user selects a high speed mode, monitors the tape counter, and switches to PLAY just before the beginning of the segment.

Some higher-priced VCRs provide means to connect an electrical cable to enable a controller or computer to read the tape counter and control the VCR's tape transport system by electrical signals. Many medium-priced VCRs have built-in means for selecting and positioning to a small number of locations. These kinds of system are generally proprietary and available only on particular VCR models. They do not facilitate distribution of positioning information so as to enable other copies of a tape to be rapidly and accurately positioned to the same arbitrary locations on other users' VCRs.

The invention described in this application relates to a control system for rapidly and accurately positioning consumer-type VCRs to arbitrarily selected tape positions. It is applicable to most VCRs that are controllable by infrared or other externally generated signals, as are all or almost all VCRs including most consumer VCRs.

2. Prior Art

Automatic rapid tape positioning is desirable for general convenience and is necessary for interactive applications. Several patents address this requirement, especially in relation to VCRs. Most of these involve modifying the VCR's design to incorporate a sensor so as to obtain instantaneous information relating to tape position and/or movement: See also Heep U.S. Pat. No. 5,206,767; Hashimoto U.S. Pat. No. 4,873,584; Guerro U.S. Pat. No. 4,511,937; Sykes U.S. Pat. No. 3,714,382; Gohda et al. U.S. Pat. No. 4,499,509; Westall U.S. Pat. No. 4,701,814; Steel U.S. Pat. No. 4,692,819; Yamanaka et al. U.S. Pat. No. 4,805,053; Corkenny U.S. Pat. No. 4,473,853; and Takeuchi et al. U.S. Pat. No. 4,819,087.

Clearly, before automatic positioning can be used, the locations of tape segments having particular information must be determined by some means. With a VCR, a viewer usually determines the locations by observing a built-in tape counter as the particular information begins to play.

Some VCRs incorporate automatic positioning features such as are described above. The usefulness of these features is limited, because the features are neither widely available nor standardized. If the location on a tape of particular information has been determined on a VCR "A" made by one manufacturer, that information may be of no use in locating the information when the tape is played on VCR "B" made by another manufacturer, or even on VCR "C" made by the same manufacturer as VCR "A".

Hahn in U.S. Pat. Nos. 4,945,425 and 5,043,829 utilizes a positioning system requiring no modification of the VCR and using timecodes and VCR performance information which he obtains through a calibration procedure. His patents are focused on a special technique for identifying a particular frame on a videotape that is not timecoded, so that the frame can be used as a reference point when editing the tape. Hahn describes the tape positioning procedure and calibration of VCR performance only in broad outline and describes no provision to enable distributed copies of a of a tape to be used interactively or positioned to the same edit points on various VCRs.

Rodesch et al. in U.S. Pat. No. 4,422,105 describes a system in which predefined segments of video are recorded on tape, each segment preceded by a data segment containing alphanumeric information for display to a student, and VCR control instructions for responding to the student's input to the system. This precludes distribution of the tape except for use wish the Rodesch system. Mother disadvantage is that the positioning procedure makes use of control track information which is not available from most VCRs without modification.

OBJECTIVES AND SUMMARY OF THE INVENTION

OBJECTIVES

1. The system should be capable of rapidly and accurately positioning most consumer-type VCRs to the same arbitrarily selected locations on a videotape, on copies of that videotape and on recorded television transmissions of that videotape.

2. The system should include means for a user to define multiple arbitrary video segments, specify their precise locations on a videotape, and store this locational information in machine-readable form along with identifying descriptive text (e.g. as a table of contents in an alphanumeric computer data file.) It should also be able to decode close caption subtitles encoded on a video signal, and store them in machine readable form along with data defining the precise locations at which they are recorded on videotape.

3. The system should include means for encoding and decoding suitably formatted additional information (such as a table of contents file, ten commentary on the video material, system commands, etc.) onto a video tape along with standard audio and video information, in order that all can be distributed together as copies or television transmissions of the videotape.

4. Videotapes and television transmissions encoded for use on the system should play as conventional videotapes and television transmissions on standard VCRs and television sets; encoded data should not interfere with viewing and listening to the recorded or transmitted audio-visual material.

SUMMARY

The invention disclosed makes possible preparation and widespread distribution of video information for distance learning and other applications of interactive video using consumer-type VCRs, television receivers and data terminals. It includes means for timecoding a video signal and for reading timecodes from a video signal. The timecodes can be imbedded in either the audio or video signal. (Video encoding is preferable to meet Object No. 4). The invention also includes means for rapidly and accurately positioning a videotape to any particular timecode. With these capabilities, the invention makes possible new interactive video applications utilizing inexpensive consumer-type equipment.

For instance, at the most basic level, a user of the invention can define segments of a videotape by titles and their respective starting and ending timecodes. If the user then selects one or more such segments, in any order, the invention can locate and play each segment in the selected order. At another level, the invention allows copies of a timecoded tape to be distributed along with a list of segments (hereinafter termed a "Table of Contents" or "TOC"), each segment identified by a title and defined by starting and ending timecodes, so that many users of the invention can select video segments for viewing by title and benefit from the ability of other realizations of the invention to locate and play them automatically.

The invention also includes means for encoding and reading from a video sisal any binary encoded data, especially including a TOC, system control codes and system control programs. Thus, video material encoded with timecodes and control data can be distributed as videotapes, or as television transmissions which can be recorded on videotape by receivers of the transmissions. Recipients of the tapes or transmissions can then utilize the invention to view the video material interactively without themselves having to specify segments and their locations.

As an aid to creating TOCs, the system includes means for reading close captions and storing each caption along with the timecodes corresponding to the appearance and disappearance of each caption, thus automatically defining video segments.

Finally, the invention includes means to process multiple TOCs as a single database, to designate a sequence of segments selected from one or more of the TOCs, and to play the sequence, directing the user to change video tapes when appropriate and indicating which tape to insert. The database includes word search and sort capabilities to assist in locating particular video segments.

BRIEF DESCRIPTION OF THE DRAWINGS

FIG. 8 is a typical videotape table of contents.

FIG. 9 is a typical table of contents formatted for encoding on a video signal.

DESCRIPTION OF THE PREFERRED EMBODIMENT

The system herein described is comprised of electronic hardware, soft-ware and firmware, which controls one or more VCRs and is therefore of the type often referred to as a "VCR controller" or simply, a "controller." The system requires that the VCRs' principal operations (especially the tape transport and change-mode operations: record, play, forward-seam reverse-scan, fast forward, rewind, pause, stop) be controllable by externally generated signals (e.g. infrared or electrical). It is applicable to all current TV broadcast signal formats (NTSC, PAL, SECAM), and current consumer VCR recording standards (S-VHS, VHS, BETA, Video8, etc.) It includes means for accepting a video signal from any source (including a controlled VCR), encoding it with timecodes and other data, and recording the encoded signal on a VCR which also can be controlled. The timecodes are numbers that increase regularity as the encoding procedure continues and serve to specify positions on a videotape. The other data referred to can include any numeric or text data. The controller includes means for decoding ("reading") timecodes and arbitrary data previously encoded on a received video signal. In addition to, or instead of, recording a received video signal on a VCR, the controller can display it on a TV monitor. Commands, control data and other data are received from and transmitted to users through an interface and a data terminal. The controller includes computing means which can include a CPU, working memory, programs stored in EPROM and data stored in EEPROM.

CONFIGURATIONS AND OPERATIONS

Figure 1:
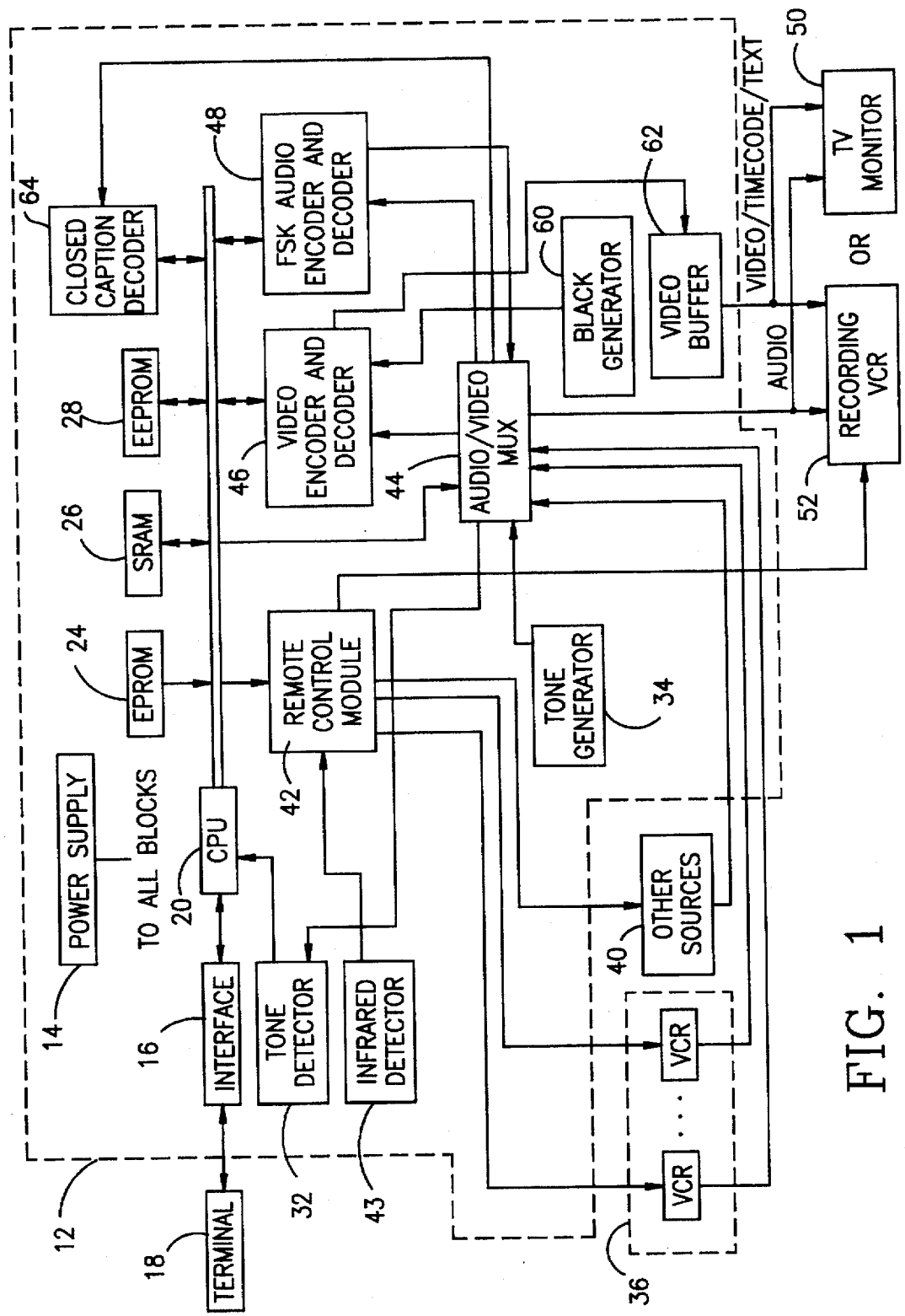
FIG. 1 is a block diagram for the controller.

The block diagram of FIG. 1 illustrates the internal functional modules of controller 12 as well as its external connections. Power supply 14 supplies DC power to all parts of the controller. Interface 16 transfers user commands from data terminal 18 to CPU 20, and transfers system status information from CPU 20 to data terminal 18. EPROM 24 stores the program for CPU 20. SRAM 26 stores temporary data from CPU 20. EEPROM 28 stores permanent data for CPU 20. CPU 20 communicates with other functions within the controller through address and data bus 30.

Tone detector 32 serves two purposes. First, it is used in determining the amount of time it takes a VCR to accelerate from pause to play speed (preroll). Second, it is used to identify a reference point recorded on non-timecoded tapes to enable synchronized timecoded copies to be made. Tone generator 34 is used to record the above mentioned tone on a tape if it is not already there.

Block 36 represents any number of VCR's which can be controlled by the controller and which supply baseband audio and video signals. Other baseband signal sources 40 such as a TV tuner or a laser disc player can be accepted and can be controlled by the controller.

Remote control module 42 is used to convert commands from CPU 20 for any VCR 36 or other signal source 40 into infrared or electrical command signals and transmit them to the intended VCR or other source.

Audio/video multiplexer 44 routes baseband audio and video signals from VCR(s) 36, other sources 40 and tone generator 34 to video encoder and decoder (CODEC) 46, FSK audio CODEC 48, tone detector 32 and recording VCR 52 or TV monitor 50. The audio/video multiplexer operates under the control of CPU 20.

Video CODEC 46 encodes the vertical blanking interval (VBI) of an outgoing baseband video signal with timecode and/or text, and decodes timecode and/or text that is present on an incoming video signal. The functions of CODEC 46 are controlled by CPU 20. Black generator 60 supplies a black video signal to CODEC 46 if the incoming baseband video signal is lost. Video buffer 62 amplifies the outgoing video signal.

The FSK audio CODEC 48 encodes an outgoing baseband audio signal with timecode and/or text, and decodes timecode and/or text that is present on an incoming audio signal. All functions of FSK audio CODEC 48 are controlled by CPU 20.

The close caption decoder 64 decodes the subtitles that are sometimes prerecorded on video signals.

The system can be configured in various other ways. As examples: 1) computing means 20 can be provided by a host computer and the other components of controller 12 can be housed in a separate unit; 2) interface 16, data terminal means 18 and power supply 14 can be provided by a host computer and the other components of controller 12 can be placed on a computer expansion card within the host computer; 3) data terminal 18 can communicate by infrared or other means with controller 12 housed within a VCR 36. The system can also be configured with data terminal 18 input functions provided by various combinations of devices including a keyboard, a barcode reader, a touch-screen CRT or panel display, etc., and output functions provided by such devices as digital data displays or TV monitor 50. Data terminal storage functions can be provided by any of a wide range of devices including magnetic disks and magnetic cards.

ENCODING

Setup

Figure 2:
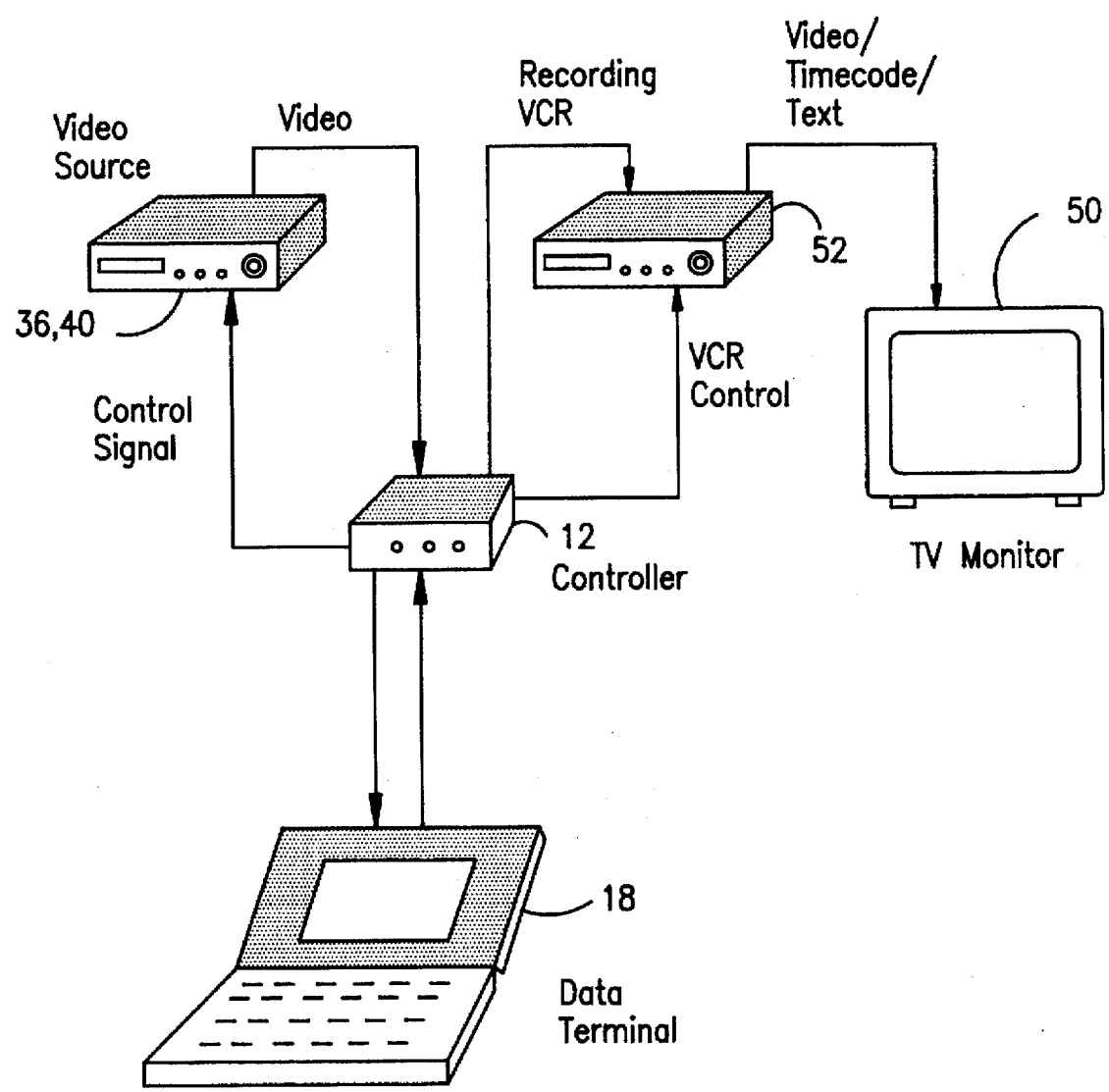
FIG. 2 shows the invention in a typical tape encoding configuration.

FIG. 2 shows the system configured for encoding the input signal (the output of one of the VCRs 36 or other video source 40) and recording the encoded signal on a second VCR 52. A TV monitor 50 is connected to the output of the recording VCR to assist in monitoring the process. The user controls the process from a laptop computer serving as data terminal 18.

Timecodes and other distal information are encoded either on the vertical blanking interval (VBI) of the video signal or on an audio channel. Widely used timecoding formats for both VBI and audio channel are specified by the Society of Motion Picture and Television Engineers ("SMPTE") and the invention can generate and apply timecodes conforming to either of these formats as well as others.

The SMPTE specification for audio timecode (usually referred to as "longitudinal") has limited utility when consumer-type VCPs are used, because access to audio tracks other than the baseband mono and stereo tracks is usually not available. If the timecode is to be recorded as a digital signal on the same track as acoustic information, it is not easily separated from the acoustic information when played back. For example, timecode could be recorded on the left audio channel and the acoustic information (both left and right stereo) could be recorded as a monaural signal on the right audio channel. However, when played back on a monaural VCR, the timecode would interfere with the acoustic signal.

Instead, where there is reason to use audio encoding instead of VBI, the invention utilizes FSK CODEC (48 in FIG. 1) to convert distal data to analog, encoding zeros and ones as pure tones (sine waves) with two different frequencies. The resulting analog signal can be either mixed with acoustic information prior to recording, or recorded directly on a separate audio channel if this option is available and preferred. When played back using the controller, filters within the FSK CODEC module separate the analog timecode signal from the acoustic information, and the CODEC then converts the analog timecodes to digital form. (These processes can be used to encode and decode timecodes in tenths of seconds and to carry other distal information, but they do not have the capacity to support the complete SMPTE longitudinal (audio encoding) format at video frame frequencies of 25–30 per second. The capacity limitation arises from the limited bandwidth of the audio circuits in many consumer VCRs.)

The invention (see FIG. 1) includes conventional circuitry 32 and 34 for generating and detecting an audio tone with frequency in the range 800–1000 Hz. This capability can be used to insert and detect a timecode reference point in a video source. (Usually, videotapes intended for broadcasting already include one or more such tones as part of a ten second countdown preceding the program material.) Such a reference is needed when digital information must be encoded to synchronize with the video signal or when using the invention as a video editor.

Procedure

Figure 3:
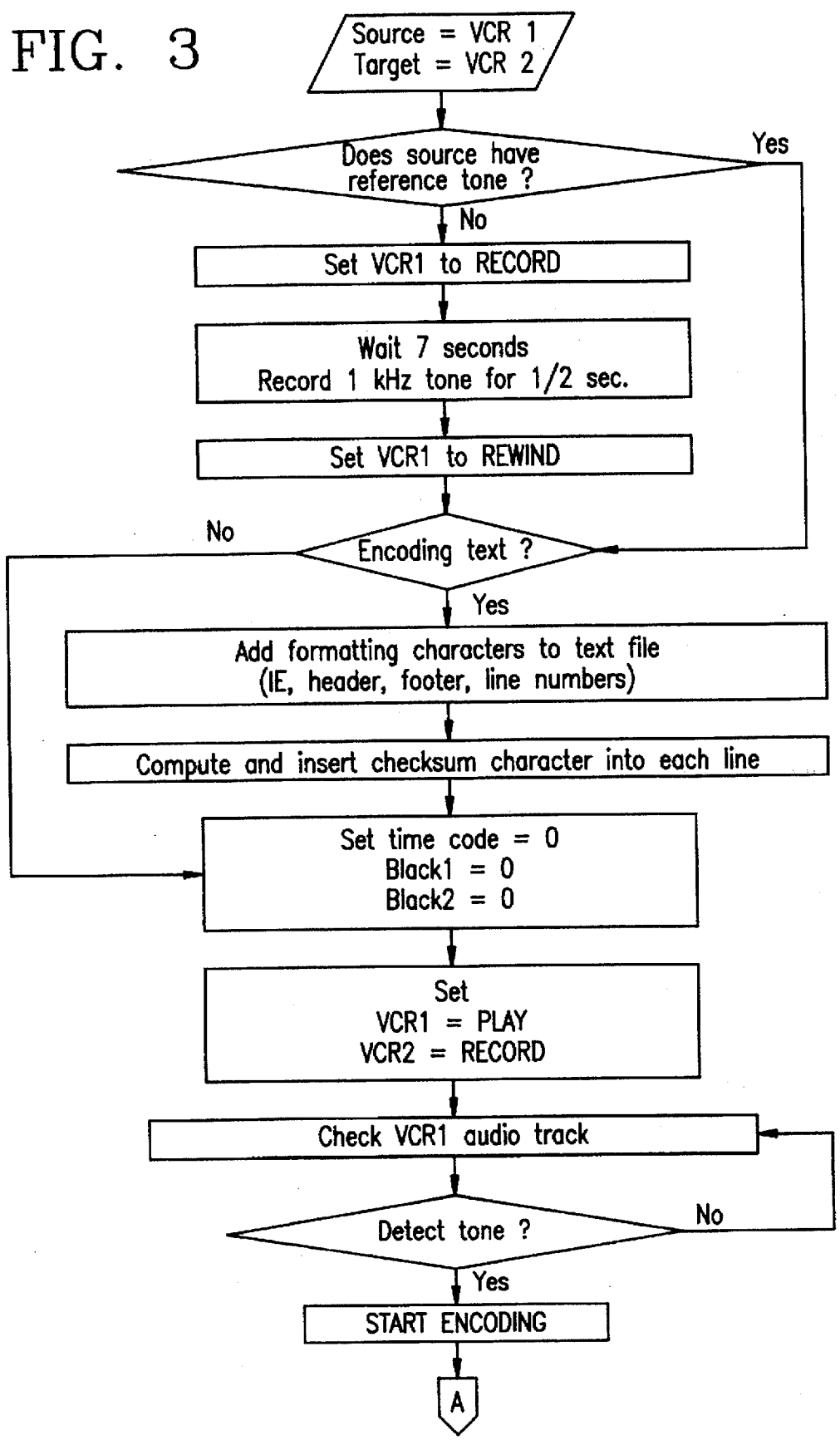
FIG. 3 is a flowchart for the process of encoding a videotape with timecode and (optionally) with a text file such as a table of contents.
Figure 3A:
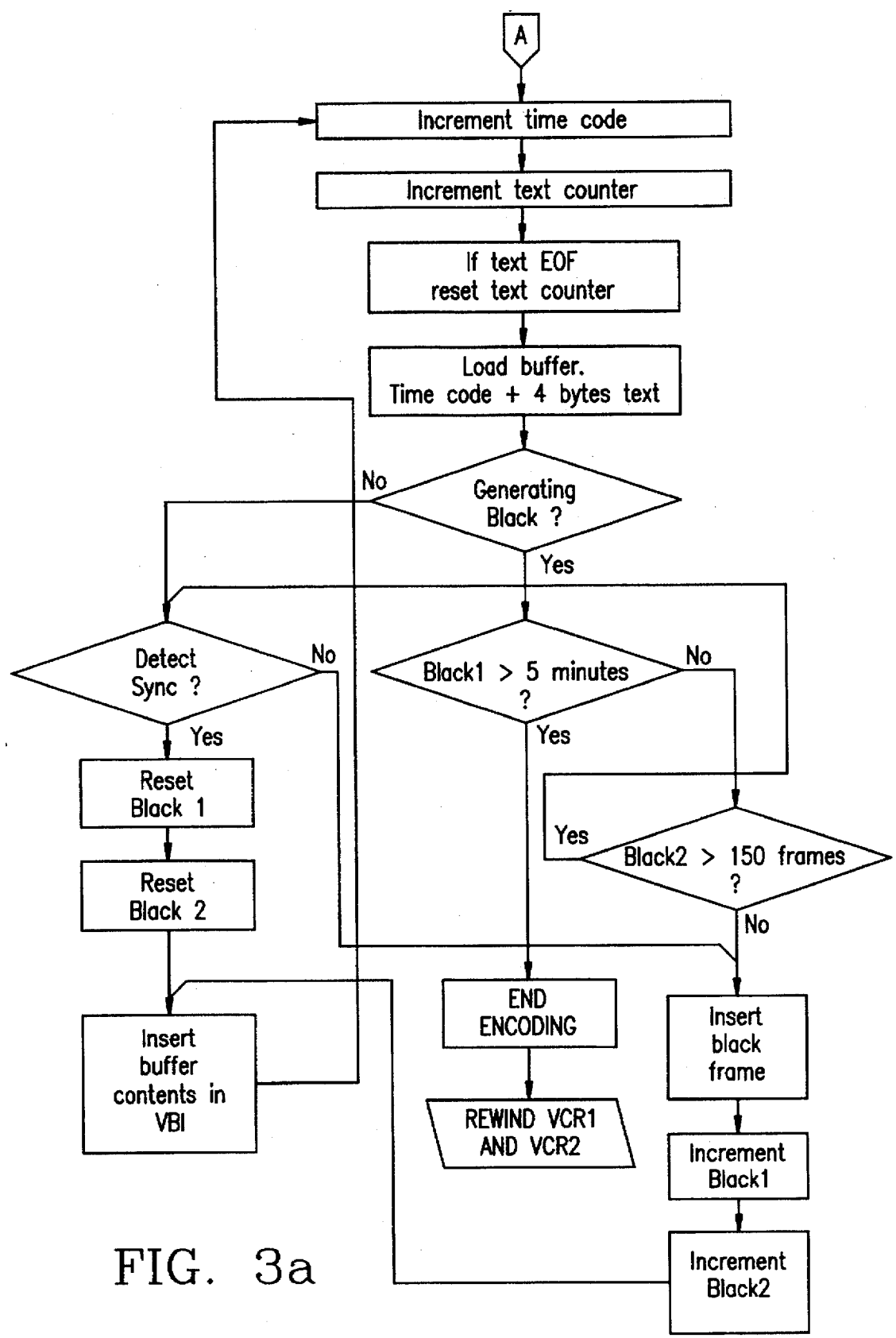

The encoding procedure is controlled by CPU 20 (see FIG. 1) and its software. A flowchart in FIG. 3 describes the procedure.

Assume the video source is a VCR denoted VCR1, the source signal is to be timecoded in two particular lines of the vertical blanking interval, and the encoded signal is to be recorded on a fully rewound tape in VCR2. Referring to the flowchart, the procedure is seen to begin by determining if a reference tone is to be applied to the source and, if so, the controller applies it. The procedure next determines if the user intends a text file (e.g. a table of contents) to be encoded. If so, the user provides a reference to enable the system to access the file. The system counts the lines, determines the number of characters (including spaces) in each line, and computes a checksum for each line. It then assembles Record 0 containing the line count, the character count and checksum for each line, and for record 0. FIG. 9 shows the resulting record after formatting has been added. The system sets the timecode register to zero hours, minutes, seconds and flames, and sets VCR1 into play mode and VCR2 to record.

As VCR1 plays, the system monitors its audio output for the reference tone. When the tone is detected, it begins to increment the timecode register every one-thirtieth second. If vertical "sync" is detected on the VCR1 input, it increments the register at the top of each video frame instead of at timed one-thirtieth intervals. If vertical sync is not present, it generates a black screen (module 60 in FIG. 1) which it encodes and transmits to VCR2.

Text encoding is performed simultaneously with timecoding. Four bytes of text are transmitted with each timecode, beginning with the record 0 data. A checksum is computed for each packet of data consisting of a timecode and 4 bytes of text. The entire file is transmitted repeatedly until the timecoding process is completed.

EDITING AND PLAYBACK SETUP AND DECODING PROCEDURE

Setup

Figure 4:
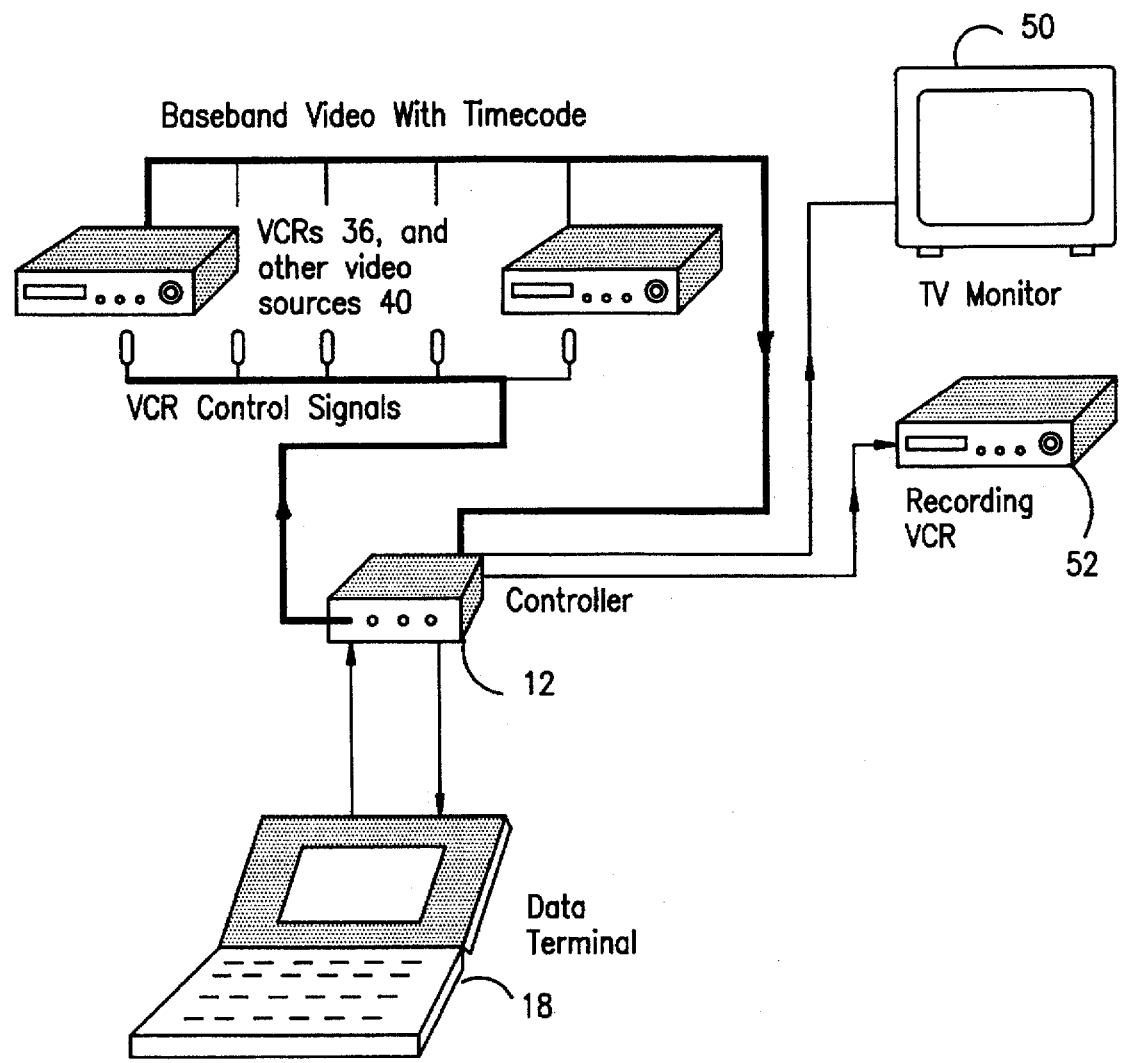
FIG. 4 shows the invention in a typical playback configuration.

FIG. 4 shows the system configured for editing and playback. In response to commands from the data terminal 18, controller 12 locates and plays segments of timecoded tapes loaded in one or more VCRs 36 and displays them on TV monitor 50 and/or records them on recording VCR 52.

Procedure

When a video signal is received at controller 12, the controller scans the vertical blanking interval searching for timecoded lines. Once it detects timecode it reads the corresponding lines in each video frame and transfers the timecodes and any text data to CPU 20 (FIG. 1).

CPU 20 creates a form for storing the text file. It enters characters into the form as acceptable data packets are received. If a checksum computed for a data packet does not match the transmitted checksum, the corresponding characters are left blank. With each repeated reading of the incoming data packets, the CPU fills more spaces in the text file form until all checksums are correct, indicating that the complete text file has been recovered.

POSITIONING METHOD

The controller 12 commands the tape transport system of any VCR(s) 36 by means of infrared or electrical signals (see FIG. 4). While a VCR is in play mode, the controller determines tape position by decoding the prerecorded timecodes. However, timecodes cannot be read while a VCR is in fast forward and rewind modes; and for many consumer VCRs, timecodes cannot be read in forward and reverse scan modes. To enable the faster modes to be utilized in tape positioning, tape movements for modes other than play are controlled by timers in the controller's CPU 20 instead of by monitoring timecodes; but after each such movement, the VCR is put into play mode so that timecodes can be read and tape position positively determined. Denoting current position as "Here" and the desired or target position as "There", the combination of open and closed loop control can be summarized as consisting of 4 steps:

1. In play mode, read timecode to determine "Here"
2. Start timer, change to a fast mode
3. At calculated time, change to play and read timecode
4. Read timecode. If new position is not "There", repeat process.

In order to perform this iterative control procedure, timing relationships for the various movements must be understood and their parameters determined. The relationships are represented by the following formulas:

Play

Since the VCR is already in play, the runtime by the play mode from the current position ("here", timecode TC1) to the intended or "target" position ("there, timecode TC2) is simply the timecode difference.

$$\text{PTIME}=TC2-TC1$$

Scan Modes

Tape speed in scan modes is controlled by a constant speed flywheel-driven capstan. Given the VCR is in play at TC1 and is again in play at TC2, the time to reposition from TC1 to TC2 by a scan mode is the time to perform the following series of steps:

a) Shift to SCAN mode; time required=$b_1$
b) Accelerate to SCAN speed; time required=$b_2$
c) Maintain SCAN speed for distance TC2–TC1–TCC, where TCC is the distance the tape moves during a), b) and d); time required=$b_3\times(TC2-TC1-TCC)=b_3\times(TC2-TC1)-b_3\times TCC$
d) Decelerate and shift to PLAY; time required=$b_4$ The times to perform steps a), b) and d) are represented as constants because they are found to vary very little for any particular VCR or among individual VCRs of the same model. The time to perform step c) is a constant times the distance TC2–TC1 minus b×TCC. As TCC varies very little among VCRs of the same model, the entire term $b_3\times TCC$ is a constant which can be represented as $b_3$.

Thus, the total time to perform the four steps for forward-scan (denoted FSTIME) is $$\text{FSTIME}=b_1+b_2+b_3\times(TC2-TC1)+b_4$$

Let $a_1=b_1+b_2+b_4$, and let $a_2=b_3$. Then, the time to move a distance TC2–TC1 in forward scan mode is:

$$\text{FSTIME}=a_1+a_2\times(TC2-TC1)$$

Similarly, the time to move distance TC2–TC1 in reverse scan mode is:

$$\text{RSTIME}=a_3+a_4\times(TC2-TC1).$$

Fast Forward And Rewind

In consumer-type VCRs, tape speed in the FAST modes depends primarily on the rotational speed and effective diameter of the take-up reel and can increase several hundred percent as the effective diameter increases from that of an empty reel to that of a full one. Rotational speed varies much less than tape speed.

Let function f be the number of take-up reel rotations required to position a tape to timecode x, starting from an empty reel condition, and let F(x,y) represent the difference f(y)–f(x):

$$f(TC)=\text{take-up reel rotations from timecode 0 to TC}$$

$$F(TC1, TC2)=f(TC2)-f(TC1).$$

Similarly, let g( ) and G( ) be the corresponding functions for the supply reel when the VCR is in rewind mode.

It can be shown that if tape with thickness h is wound onto a reel with hub radius r, then the number of rotations to wind on a length L is:

$$f(L)=-r/h+\sqrt{\{(r/h)^2+(L/\pi.h)\}}$$

Using these relationships, the times for each fast mode to reposition from TC1 to TC2 is the time to perform four steps analogous to steps a)–d) for the SCAN modes, approximately:

$$\text{FF: FFTIME}=a5+a6\times F(TC2, TC1)$$

$$\text{REW: RWTIME}=a7+a8\times G(TC2, TC1).$$

The dimensions and other constants needed to compute f(L) and g(L) are stored in system memory for several standard cassettes.

Preroll

Preroll usually refers to the time in seconds or frames required for the VCR to achieve PLAY speed when starting from PAUSE. A useful modification of this variable adds to it the time required to change from PLAY to PAUSE. If it is desired to PAUSE the VCR so that will begin to play or record starting from the position TC2 when subsequently commanded to "unpause", then the positioning process should be aimed at the position TC2-PPEROLL.

VCRs generally keep the audio output switched off when not in PLAY and when in PLAY before reaching PLAY speed. Although the controller can detect vertical interval timecodes before playspeed is achieved, the end of PREROLL is taken to be the timecode when tone detector 32 first detects an audio signal after the PLAY command is transmitted.

Optimized Videotape Positioning

Figure 5:
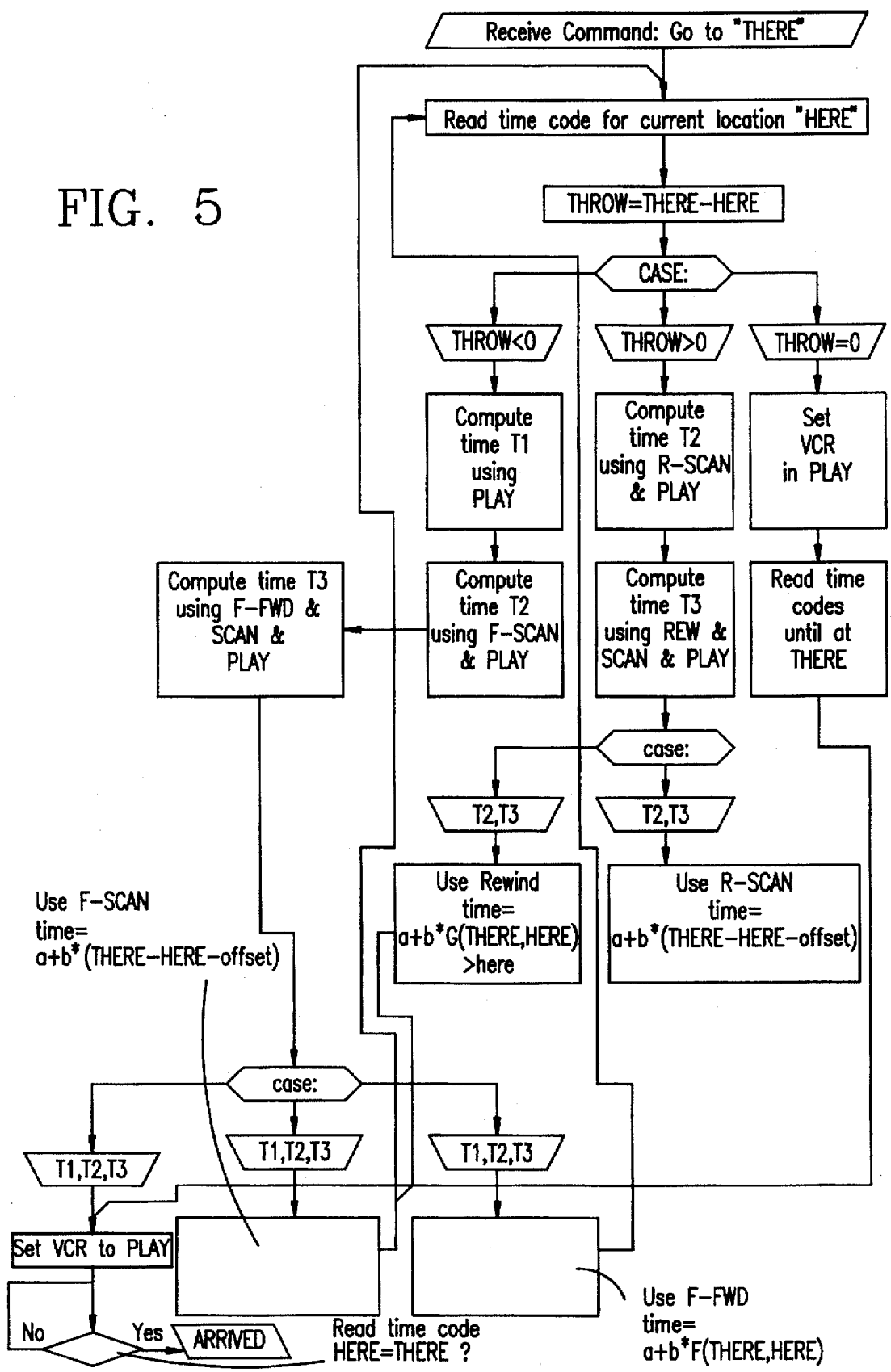
FIG. 5 is a flowchart for the videotape positioning process.

FIGS. 5 is a flowchart describing the above positioning procedure in more detail. At each iteration, the various modes are evaluated and the mode requiring the least time to reach the target is selected. However, the error in timing fast forward and rewind movements is usually large enough that at least one subsequent iteration is required. Theoretically, at each iteration of the positioning procedure, a series of calculations should be made to decide which mode should be used next so as to minimize the total remaining time to position the tape at the target timecode.

taking into account the error distribution of each parameter and all the possible subsequent iterations that might be required to reach the target. This is a problem of the type sometimes referred to as sequential stochastic dymamic programming.[1] Instead of determining the theoretical optimum solution at each iteration, the procedure employed takes advantage of two observations from experience with many VCRs:

[1] G. Hadley, Nonlinear and Dynamic Programming, (Palo Alto: Addison-Wesley Publishing Company, Inc., 1964), pp 171–181.

A. Usually, one iteration using a fast mode positions the tape so that the exposed time for the next iteration will be less for a scan mode or play than for a fast mode;

B. Usually a scan mode can be "aimed" so that the expected time for the next iteration is less for play than for any other mode.

Before each iteration, the total expected positioning time is computed for each of the three sequences below and the next mode selected is the first step in the sequence having the least estimated total time.

Sequence 1.

FAST FORWARD or REWIND to target, (assumed to miss target by amount of fast mode standard error);

then, F-SCAN or R-SCAN to (target—offset)

then, PLAY from offset to target.

Sequence 2.

F-SCAN or R-SCAN to target—offset, then PLAY from offset to target.

Sequence 3.

PLAY to target.

In Sequence 1, the time for the scan modes is the average of time by forward and reverse scan, because there is an equal probability that the fast mode will overshoot or undershoot the target. In Sequences 2 and 3, scan modes are always aimed at an offset position earlier than the target so that there is a high probability that the next movement will be in the forward direction and in the play mode. An offset of three times the value of the scan mode standard error is sufficient to achieve this result in most instances.

VCR SETUP AND CALIBRATION

Infrared Command Codes

The controller incorporates a "universal remote control" microprocessor which stores numerous sets of command codes and can be rapidly switched between sets so as to control multiple VCRs. Setting up a VCR begins by determining which set of codes it responds to, if any. If none of the built-in code sets controls a particular VCP, the microprocessor can be switched to "learn" mode. In this mode, the microprocessor receives the appropriate control signals from the VCR's hand-held remote controller and stores them in memory as a new code set.

Calibration

Figure 6:
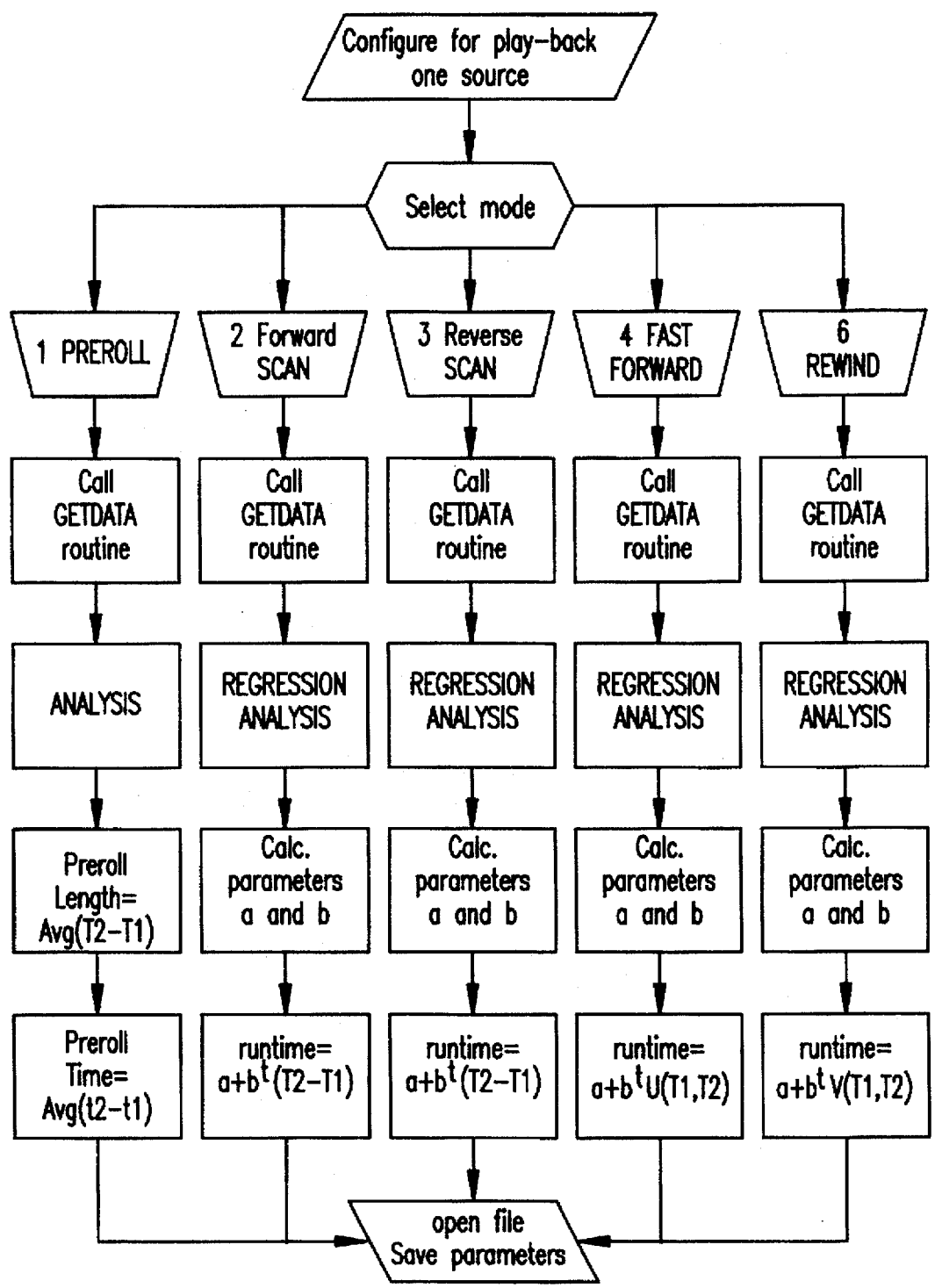
FIG. 6 is a flowchart for the VCR calibration process.
Figure 7:
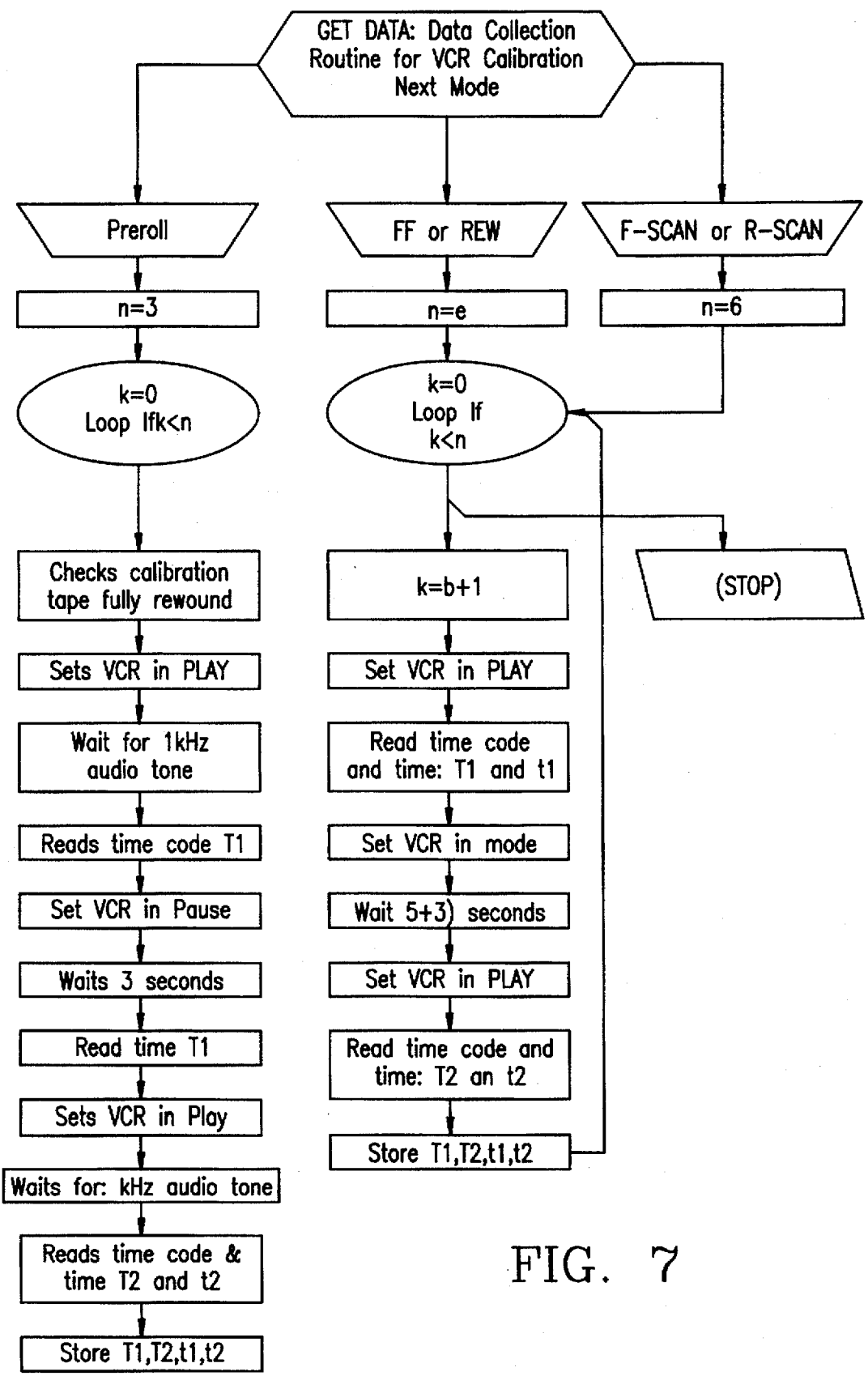
FIG. 7 is a more detailed flowchart for the data collection portion of the calibration process.

VCR calibration is performed entirely automatically. Referring to FIG. 4, the VCR to be calibrated is one of VCRs 36. Built-in software (flowcharts shown in FIGS. 6 and 7) causes the subject VCR to perform various tape transport operations repeatedly, collects data on how each operation is performed (flowchart in FIG. 5) and analyses the results to obtain values for a set of parameters which characterize the performance of the VCR and are stored in a data file.

Generating and Collecting VCR Performance Data

The runtime formulas above reflect differences in cassette measurements and videotape recording speeds and formats, but do not reflect the differences between VCRs of different models. The calibration process performs each type of movement several times and measures and records the tape movement and time required each time. The data generating and collecting process, is diagrammed in FIGS. 6 and 7.

Data Analysis

The recorded data are analyzed to determine values for the parameters $a_1, \ldots, a_8$ applicable to the subject VCR and other VCRs of the same model. Analysis consists of computing a least squares estimate and standard error of estimation for each parameter and each runtime formula using statistical linear regression.[2] The procedure assumes that each measure movement in forward scan (for example) conforms to the FSTIME equation on page 13, except for a random error. If data are collected for N forward scan movements, then for the ith movement (i=1, ..., N):

$$\text{FSTIME}_i = a_1 + a_2 * (\text{TC2}-\text{TC1}) + e_i.$$

[2] Linear regression is a standard statistical procedure. See, for example, Murray R. Spiegel, Theory and Problems of Statistics, (New York: Schaum Publishing Co., 1961), pp 269–272.

Multiple regression computes the unique pair of values for $a_1$ and $a_2$ that minimize the sum of squares of the errors: $\Sigma(e_i)^2$. The standard error for the equation can be estimated as $\sqrt{(\Sigma(e_i)^2/N)}$.

Values $a_1$, $a_2$ and the equation standard error are stored in a data file and read into RAM memory when the subject VCR of other VCRs of the same model are to be controlled by controller 12. Values for the constants of the other tape movement equations $a_3, a_4, a_5, a_6, a_7, a_8$ and their standard errors are similarly computed and stored.

EDITING AND PRESENTATION PROCEDURES

Segmenting Videos

The benefits of the positioning capability are obtained when the invention is programmed to locate and play a video segment or a sequence of segments, each defined on the basis of the content of the video information. Software for this purpose enables a user to view a timecoded videotape, indicate the beginnings and endings of segments by means of data terminal 18, and store the corresponding timecodes. For example, using a terminal equipped with a computer keyboard, when an INSERT key is pressed, the controller's CPU 20 records the last read timecode and invites the user to type a suitable title for the segment. To note the end of a segment, the user presses an END key and the CPU again notes the last read timecode.

Table of Contents

As the user continues this process, the CPU builds a list of segments each having a title, a beginning timecode and an ending timecode. A list of defined segments for a particular videotape is termed a "tale of contents" or TOC.

A compound command called PLAY SEGMENT transmitted to the controller causes a list of defined segments (referred to hereafter as a "table of contents") to be presented on the data terminal's screen. When the user then selects a particular segment, the controller positions the videotape to the beginning of that segment, plays until the timecode corresponding to the end of the segment is read, then stops or pauses awaiting further instructions.

Scripts

In a variation of this procedure, the user can arbitrarily select and name a sequence of segments which the controller stores in the table of contents. Using a compound command called PLAY SCRIPT, the user is presented with a list of all the scripts defined and stored in the table of contents. Upon choosing one, the controller plays the constituent segments in the order in which they were selected.

FIG. 8 shows a typical table of contents. The first entry in the table is the number of segments. The segments are each defined by their beginning and ending locations on the tape and its title. In this case the locations are expressed as tenths of second rather than hours, minutes, seconds and frames, which is adequate precision and more convenient for many purposes.

Following the list of segments is a numeral indicating the number of defined scripts—in this case one. Then follows the number of segments in the first script (3), the positions of these segments in the list of segments (third, second and fourth) and the title of the script.

Playing Scripts With Two Or More VCRs

With identical copies of a timecoded tape loaded in two or more of the input VCR(s) 36 in FIG. 1), the controller can alternate between them, playing one while positioning others. In this manner, between segments are almost eliminated.

Distributing Tables of Contents

An advantage of the invention is that copies of a timecoded videotape can be positioned to any particular timecode on any realization of the invention that includes VCR(s) 36 conforming to the same VCR standard (VHS, BETA, etc.). Thus, if a table of contents has been created for a videotape, copies can be distributed along with copies of the videotape which recipients can immediately utilize, saving them the time and effort involved in creating one by hand.

Copies of tables of contents can be distributed in any form that can be entered into controller 12 through interface 16 (see FIG. 1). One method is to record it on a "floppy" diskette that can be read and transmitted by a suitable data terminal 18.

Encoding Table of Contents

Instead of distributing the table of contents recorded on a separate medium, a procedure has been developed for distributing it as a data file encoded on the videotape.

The procedure begins with creating a timecoded copy of the videotape and developing a table of contents. Then a second timecoded copy is made from the original tape, this time encoding the table of contents along with the timecodes. Generally, a table of contents occupies only a short length of videotape and there is room to encode several copies of the table of contents end-to-end. This permits very exhaustive error detection and correction and an error-free copy can usually be recovered.

The procedure utilizes an encoded tone on the untimecoded original videotape as a reference point to ensure that the process of making a timecoded copy from the original can be replicated. By this means a table of contents developed for the first timecoded copy will apply to the second copy on which it is itself encoded.

The resulting encoded videotape can be transmitted as a TV program or copies can be made and distributed.

Decoding Table of Contents On Distributed Tape Copy

If VBI encoding has been employed, the tape can be viewed with a VCR in the same way as a non-encoded tape—the encoded table of contents is invisible to the VCR. However, by means of the invention, the table of contents can be recovered from a distribution copy of the tape, stored in system memory as digital data, and used for VCR positioning, just as if it had been developed from the distribution timecoded tape or distributed as a computer diskette.

Closed Caption: Automatically Creating Table of Contents

Closed caption refers to text encoded on the video signal, usually on line 21 in the VBI, which with suitable equipment can be displayed as subtitles on the video screen. The text is commonly delimited by end-of-line and end-of-sentence "symbols" (which are not displayed) as well as by changes in the displayed text.

The invention includes means to read closed captions when they exist on a video signal. The text is transmitted to CPU 20 which stores each line along with the two timecodes coinciding with the lines appearance and disappearance. The resulting data file is an automatically created table of contents. If the signal originates From a VCR, or is being recorded on a VCR, the table of contents can be used to position the tape to the point where a subtitle first appears.

Segments defined in this manner are typically inconveniently short. However, the invention also includes editing means to combine several video segments into a single segment, and to assign a new title to such aggregated segments, thus automatically creating a table of contents.

BROADCASTING INTERACTIVE TELEVISION PROGRAMS

Preparing Program for Broadcasting

A tape can be prepared for broadcasting in the same way as described above: a timecoded copy is made; a table of contents is developed; the table of contents is encoded along with timecode as a second copy of the original is made. Timecodes on both copies are synchronous because they are referenced to the position of a tone encoded on the original.

When the copy with both timecode and table of contents is broadcast it can be received and recorded on consumer-type VCRs (of any type: VHS, BETA, etc.). The table of contents can be recovered and used to position the tape to play the segments it defines.

Automatic Recording of Interactive Broadcasts

In a variation of the system configuration shown in FIG. 2, a VCR 36 or other television receiver 40 is tuned to a television station which broadcasts programs encoded in the vertical blanking interval turned on and it is loaded with a fully r VCR's power is turned on and it is loaded with a fully rewound blank videocassette. At the beginning of an encoded broadcast, prior to the beginning of the encoded table of contents, the television station encodes a sequence of characters signifying a command to recording VCR 52 to record.

If 36 is a typical consumer-type VCR, the controller receives the baseband video signal even though the VCR's tape transport has not been activated. When the CPU 29 detects a signal commanding it to record it transmits a RECORD command to the VCR through the remote control module 42, whereupon the VCR begins to record the incoming signal. The CPU 20 decodes and stores the table of contents and continues to record the video signal until it detects a signal commanding it to cease recording.

Upon completion of the broadcast, the receiving system can display the table of contents and position to any item, dispensing with the need for the user to view the entire broadcast in order to select material for presentation or other use. Thus, a social science teacher, for example, could present a particular topical item from a news broadcast with minimum time spent on preparation.

MULTIMEDIA AND INTERACTIVE PROGRAMS

The data terminal in 18 (FIG. 1) can be replaced with a computer running a program which interacts with a user to ask questions and receive answers, display videotape segments, and present segments of information in other media. The computer software generates and transmits to the controller commands to position a VCR to the beginning of a predefined segment and pause, then to play the segment, then to position to another segment, . . . etc. With the system configured to receive an encoded broadcast, the broadcast data can include questions, answers, and interactive commands as data for use in software resident in the receiver's computer.

In describing the system, reference has been made to a preferred embodiment and illustrative advantages of the present invention. Those skilled in the art, however, will recognize additions, deletions, modifications, substitutions and/or other changes without departing from the instant invention and appended claims.

We claim:

1. A system for locating a point alone a recording tape from a second point along said tape;
    a VCR for receiving said tape,
    a controller having means to command said VCR through multiple transport modes,
    a sequence of timecodes along the length of said tape,
    first means to store the control signals for said VCR,
    second means to store performance parameters for movement between said points by said transport modes depending on the distance between said points and their locations along the length of said tape, the length and thickness of said tape and the diameters of the payout and take-up reels, and
    third means to calculate the least time necessary to move to said point from said second point utilizing said performance parameters together with said locations along the length of tape and said tape and reel dimensions.

2. The invention of claim 1 wherein the said second means utilizes pre-stored information identifying the times to change from PLAY to each of the fast modes FAST FORWARD and REWIND, and precalculated factors for calculating the time to move in said fast modes to said point from said second point in the fast mode depending on the relative positions of said points on said tape and the time depending on the locations of said points along the length of said tape.

3. A system for moving a VCR tape in a video cassette recorder from a first point along its length to a second point in the minimum time comprising;
    at least one VCR,
    controller means for transmitting VCR commands including PLAY, PAUSE, FORWARD-SCAN, REVERSE-SCAN, REWIND, PAUSE, STOP, RECORD, and digital data to said VCR,
    second mess for encoding and decoding the audio and/or video components of a standard TV video signal with digital timecodes and other data, and recording said signal on videotape,
    third means for converting digital timecodes to analog form, encoding an audio track of said tape with said analog form, decoding the encoded audio signal and removing the analog data from the audio information carried on said audio track,
    fourth means for measuring and collecting tape transport performance data for said VCR,
    fifth means for storing said performance data,
    multiple regression means for analyzing the data collected in said fourth means and stored in said fifth means to determine performance parameters necessary for moving said tape from said first point to said second point in the minimum time,
    sixth means for synchronizing the timecoding and recording of multiple copies of a TV signal so that the timecodes on each of said copies will correspond accurately to the video and audio information in the signal,
    said controller means having first software means to enable a person viewing a videotape or TV signal, while being timecoded or which has previously been timecoded, to assign titles to various segments thereof and to store the timecodes corresponding to the location of each particular segment,
    second software means for creating a Table of Contents for the audio/video information on said timecoded videotape that consists of a list of video segments defined by their beginning and ending timecodes, such segments not necessarily mutually exclusive or exhaustive of the video information,
    third software means to define scripts each consisting of a sequence of segments selected in any order from said Table of Contents of one or more videotapes,
    fourth software means to locate and play the segments of a selected script in the sequence order in which they are listed in said selected script, and
    fifth software means to minimize the waiting time before each segment is played by positioning the next segment to be played on one of said VCRs not currently presenting a segment.

4. A system for controlling one or more video tape recorders or video cassette recorders (both devices hereinafter referred to by the term VCR) for playing one or more videotapes comprising:
    first means to store command signals for each of said VCRs including commands to PLAY, RECORD, PAUSE, FORWARD-SCAN, BACKWARD-SCAN, FAST-FORWARD, REWIND, STOP;
    second means for transmitting said command signals to each of said VCRs;
    third means for decoding timecodes encoded on either the audio or video components of a TV signal recorded on said videotape;
    fourth means for encoding the audio and/or video components of a TV signal with digital timecodes and for recording said encoded signal;
    said videotapes having a plurality of said timecodes along its length;
    fifth means to calculate the least time necessary to move said videotapes from one point of said plurality of points to a second point of said plurality of points, and
    sixth means responsive to said fifth means for moving said tape from said one point to said second point in said least time,
    said fifth means utilizing formulas for controlling the time of operation for each tape transport mode: FAST FORWARD, FORWARD SCAN, REWIND, REVERSE-SCAN, seventh means for recording performance data for each of said transport modes of each of said VCRs consisting of timecodes of a plurality of pairs of said first and second points, and time taken to reposition from each first point to its corresponding second point,
    multiple regression means for analyzing said performance data to compute values of parameters a and b of timing functions for repositioning from any first point having time code $TC_1$ to any second point having time code $TC_2$, the timing functions for the forward and reverse scanning modes having the form:

$$time = a + b \times (TC_2 - TC_1)$$

and timing functions for the fast forward and rewind modes having the form $$time = a + b \times F(L_1, L_2),$$

where $F(L_1,L_2)$ is the number of revolutions of said take-up reel required to move said tape from said first point to said second point, $L_1$ and $L_2$ being the lengths of tape wound onto the take-up reel at said first and second points, respectively, eighth means to store parameters of said timing functions, a formula for computing the said number of revolutions:

$$F(L_1,L_2) = \sqrt{[(r/h)^2 + (L_2/\pi h)]} - \sqrt{[(r/h)^2 + (L_1/\pi h)]},$$

r being the hub radius of the take-up reel, h being the thickness of the tape, and π being the universal ratio of the circumference of a circle to its diameter, ninth means to utilize said stored parameters and formulas to compute time for repositioning said tape from any first point to any second point;

tenth means to estimate the total time for repositioning from first point to any second point for alternative sequences of timed movements by a series of transport modes, each movement subject to statistical error, to select the transport mode most likely to minimize the total positioning time.

5. The system of claim 4 wherein said system has first software to enable a person viewing a videotape or TV signal, which is being timecoded or was previously timecoded, to define various segments by specifying a title and storing the timecodes corresponding to the beginning and end of said segment, such segments not necessarily mutually exclusive or exhaustive of the video information, a second software means for creating a Table of Contents for the said video tape that consists of a list of titles of said video segments with beginning and ending time codes for each segment, a third software means to define scripts each consisting of a sequence of segments selected in any order from said Table of Contents of one or more video tapes, a fourth software means to locate and play said segments in the order in which they are listed in the script, and to indicate when it is necessary to replace the tape loaded in any VCR with another tape, and a fifth software means to minimize the waiting time before each segment is played by controlling multiple VCRs loaded with synchronized timecoded copies of the same tape, and positioning the next segment to be played on one said VCRs not currently presenting a segment.

6. The invention of claim 5, wherein a recorded video signal A has been recovered, timecoded and recorded on videotape as First Copy B, and a Table of Contents has been created from First Copy B:

tenth means to augment said Table of Contents with error detection data, eleventh means for creating one or more First Copies C from the recorded signal A, said copies encoded with timecodes that are accurately synchronized to First Copy B and with said augmented Table of Contents, and twelfth means to distribute recorded First Copies C with Table of Contents, timecodes and error detection data as first videotape copies or as television transmissions.

7. The invention of claim 6 wherein said VCR is loaded with a First Copy C, a videotape copy of First Copy C, or a videotape recording of a television transmission of First Copy C, decoding means to decode said Table of Contents and timecodes while playing said videotape, error detection and correction means to detect and correct data errors in said Table of Content, and storage means to store and display corrected Table of Contents as a digital data file for use in positioning said video tape to play any segment listed in said Table of Contents.

8. The invention of claim 7, wherein close caption text is encoded on a video signal which is utilized to create a Table of Contents, signal processing means to read and decode close caption text, software means to assign timecodes to each caption corresponding to the instants at which said caption is first displayed and then removed as the video signal is presented, digital storage means to store the said decoded text with said assigned timecodes as a table of contents, and word search means to locate a key word in said Table of Contents and present segment(s) containing said key word.

* * * * *